Oct. 25, 1955

A. DE FEO ET AL 2,721,640

DEVICE FOR CONTROLLING THE RATE OF
INCREASE OF A FLUID PRESSURE

Filed Jan. 4, 1952

INVENTORS
ANGELO DE FEO
WILLIAM FRANCISCO, JR
BY
Victor D. Behn
ATTORNEY

United States Patent Office 2,721,640
Patented Oct. 25, 1955

2,721,640

DEVICE FOR CONTROLLING THE RATE OF INCREASE OF A FLUID PRESSURE

Angelo De Feo, Paterson, and William Francisco, Jr., Bloomfield, N. J., assignors to Curtiss-Wright Corporation, a corporation of Delaware Application January 4, 1952, Serial No. 265,032

16 Claims. (Cl. 192—85)

This invention relates to devices for controlling the rate of increase of a liquid pressure and is particularly directed to the combination of such a device with a hydraulically-operable frictionally-engageable clutch or brake in which the hydraulic pressure is provided by a power operated pump and means are provided for controlling the rate of engagement of the frictionally engageable clutch or brake members. As used herein the word "power" refer to a source of mechanical power as opposed to human power.

The invention has been designed for use in connection with a brake of a two-speed drive for the supercharger of an aircraft engine in which the drive is shifted to high supercharger speed when the brake is engaged, for example as disclosed in Patent No. 2,558,738. In the case of such a supercharger drive, when oil or other liquid is supplied to the brake cylinder by a positive-displacement pump, the pressure in said cylinder does not increase until said cylinder is full of oil with the brake piston moved into engagement with the brake plates and then, because of the incompressibility of liquids, the next increment of oil which the pump tends to force into said cylinder causes a sudden and large increase in pressure to its maximum value whereupon the brake quickly engages. This sudden engagement of the brake may subject the supercharger drive to excessive torque particularly if, as is usually the case, the maximum brake engaging pressure is considerably in excess of that required to hold the brake against slipping during steady operation.

An object of the invention comprises the provision of a novel arrangement for retarding the rate of engagement of a hydraulically-operable friction clutch or brake. The arrangement of the present invention constitutes an improvement over that disclosed in copending application Serial No. 219,041, filed April 3, 1951, now Patent No. 2,702,618, dated February 22, 1955. As in said copending application, the arrangement of the present invention includes a time-delay chamber which must fill with liquid before maximum clutch or brake engaging hydraulic pressure is obtained. A further object of the present invention comprises the provision of a novel arrangement reducing the size of said chamber required to produce a desired time-delay before maximum clutch or brake engaging pressure is obtained. In accordance with the present invention said chamber is provided with an inlet port and an outlet port both of which control the time required for said chamber to fill. A still further object of the invention comprises the provision of a novel arrangement wherein the flow of liquid to the clutch or brake engaging cylinder as well as into said time-delay chamber is throttled until said chamber is full. Another object of the invention comprises the provision of a novel mechanism for delaying the application of maximum pressure to the clutch or brake engaging cylinder such that there is little or no danger that malfunctioning of said mechanism will prevent the ultimate attainment of said maximum pressure.

Other objects of the invention will become apparent upon reading the annexed detailed description of the drawing in which.

Figure 1:
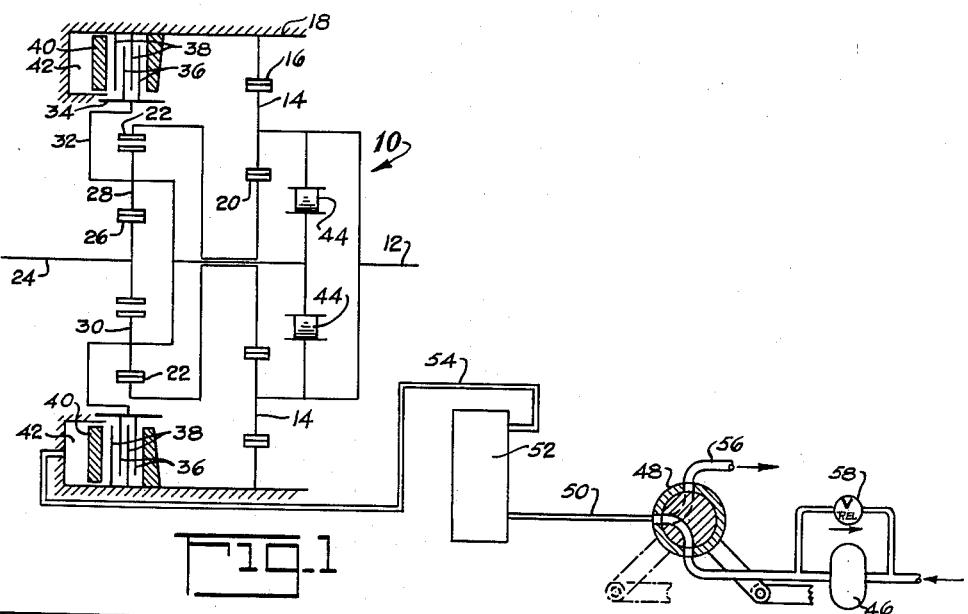
Fig. 1 is a schematic view of a transmission including a brake mechanism to which the present invention is applied.

Reference is first made to Fig. 1 of the drawing. Fig. 1 includes a schematic showing of a multi-speed transmission 10. Briefly, this transmission comprises an input shaft 12 on which a plurality of circumferentially-spaced planet pinions 14 are mounted. Each of the pinions 14 is disposed in meshing engagement with an annular internal gear 16 which is secured to a fixed housing 18. In addition each of the pinions 14 is disposed in meshing engagement with a sun gear 20. An annular internal gear 22 is connected to the sun gear 20. The output shaft 24 of the transmission is provided with a sun gear 26 concentric with the internal gear 22. A plurality of circumferentially-spaced pairs of pinions 28 and 30 are journaled on a pinion carrier member 32. The pinions 28 and 30 of each pair are disposed in meshing engagement with each other, with the pinions 28 meshing with the sun gear 26 and with the pinions 30 meshing with the internal gear 22.

A cylindrical brake drum 34 is secured to the carrier member 32. A brake comprising a plurality of frictionally engageable plates 36 and 38 is provided, said plates when frictionally clamped together locking the brake drum 34 and associated carrier member 32 to the housing 18. For this purpose, an annular piston 40 is slidable in an annular cylinder 42 toward and away from the brake plates 36 and 38. A suitable liquid, such as lubricating oil, is arranged to be supplied under pressure to the cylinder 42 for urging the piston 40 against the brake plates 36 and 38 for clamping said plates together thereby holding the carrier member 32 stationary. The carrier member 32 is also connected to the input shaft 12 through a one-way roller clutch 44 which overruns when the carrier member is held stationary. When the brake plates 36 and 38 are released, the one way clutch 44 insures rotation of the carrier member 32 with the input shaft 12 thereby providing a relatively low-speed ratio drive from the input shaft 12 to the output shaft 24.

The transmission 10 has been but briefly described, said transmission being more fully disclosed in U. S. Patent No. 2,558,738. It will become apparent however that the invention is not limited to use with this specific form of multi-speed transmission. As disclosed in said patent, the transmission 10 was designed to provide a two-speed drive between an internal combustion engine and a supercharger for the engine. Thus the transmission 10 provides a relatively low speed-ratio supercharger drive from the input shaft 12 to the output shaft 24 when the brake plates 36 and 38 are released and provides a relatively high speed-ratio supercharger drive when said brake plates are engaged.

Oil is supplied to the brake cylinder 42 from a positive displacement pump 46 under the control of a valve 48. With said control valve in the position illustrated, said oil flows through a passage 50 to a device 52 (hereinafter fully described) and thence through a passage 54 to the brake cylinder 42 to engage the brake plates 36, 38. When the control valve 48 is moved to its dot-and-dash line position the brake cylinder 42 is vented to a drain passage 56 to release the brake. A pressure relief valve 58 is connected around the pump 46 to limit the maximum oil pressure which can be applied to the brake piston 40.

With the structure so far described, when the valve 48 is turned to supply oil to the brake cylinder 42, there is no appreciable oil pressure in said cylinder until said cylinder and the passage between said cylinder and pump become filled with oil. In the absence of the device 52, because of the incompressible nature of liquids, the next increment of oil supplied by the pump 46 will cause the oil pressure in the cylinder to jump immediately to the maximum pressure permitted by the relief valve 58 thereby suddenly clamping the brake plates 36, 38 together. If said brake plates are clamped together too fast, then the forces required to accelerate the transmission parts to the higher speed may subject said parts to excessive torque. On the other hand, if the brake plates 36, 38 engage too slowly, the slipping of the plates as they engage, may generate an excessive amount of heat and cause the plates to scuff.

The maximum pressure applied to the frictionally engageable members of a clutch or brake of a multi-speed transmission generally is considerably in excess of that required to clamp and hold said members together against relative rotation in order to insure that there be no slipping of said members under severe operating conditions. In accordance with the invention, the device 52 is provided for retarding the rate of engagement of the brake plates 36 and 38 by initially applying a pressure to said plates less than said maximum pressure and then causing said pressure to rise to said maximum pressure in a controlled manner and rate.

Figures 2, 3:
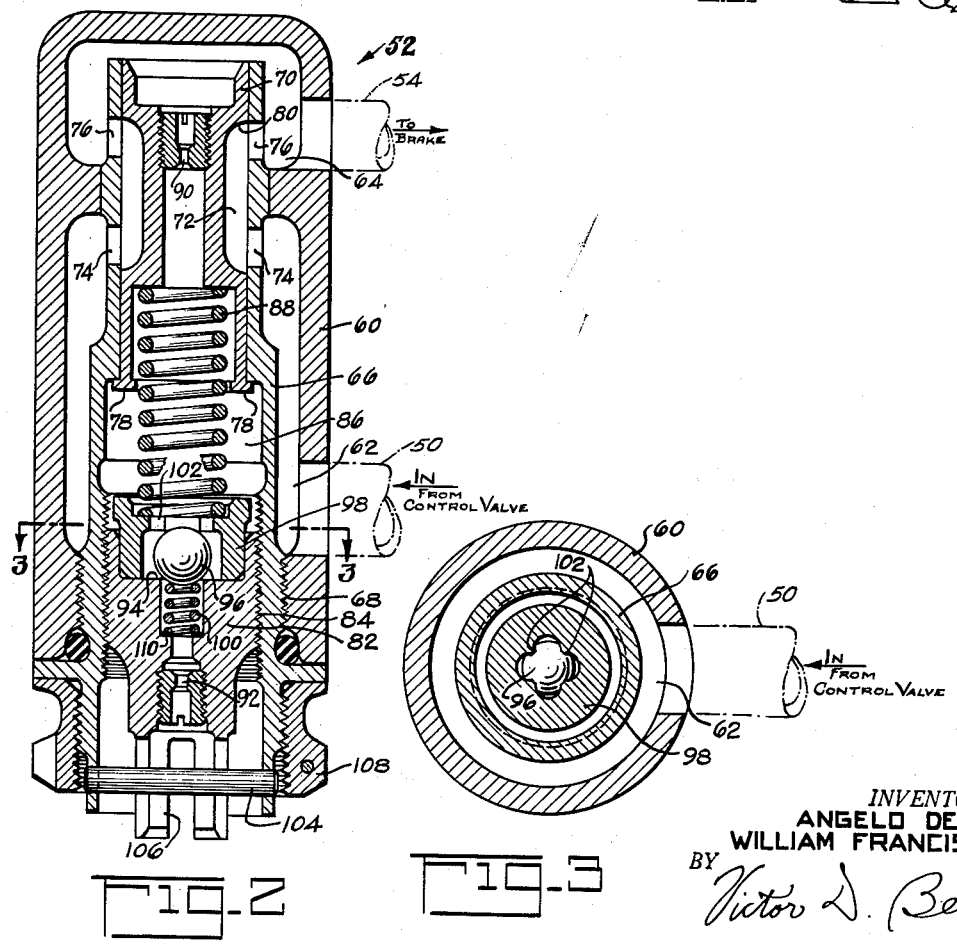
Fig. 2 is a sectional view through a time-delay mechanism embodying the invention.
Fig. 3 is a sectional view taken along line 3—3 of Fig. 2.

Referring now to Figs. 2 and 3 the device 52 comprises a housing 60 having an inlet port 62 communicating with the passage 50 and an outlet port 64 communicating with the passage 54. A fixed sleeve 66 is secured in the housing 60 by threads 68. A cylindrical plug-type valve member 70 is slidable within the sleeve 66. The valve member 70 has an annular groove 72 intermediate its ends, one end of which communicates with the inlet port 62 through a set of holes 74 in the sleeve 66 and the other end of which communicates with the outlet port 64 through a second set of holes 76 in said sleeve. A flange 78 on the valve member 70 cooperates with a shoulder on the sleeve 66 to limit upward or valve opening movement of the valve member 70 to the position illustrated. Upon downward movement of the member 70, the upper edge 80 of the annular groove 72 moves across the holes 76 to throttle the flow of liquid through said holes. Thus the upper edge 80 of the annular groove 72 constitutes the metering or valving portion of the member 70.

The valve member 70 is slidably disposed at one end of the sleeve 66 and a plug 82 is secured at the other end of the sleeve 66 by threads 84 to form a chamber 86 between said valve member 70 and plug 82. The upper end of the housing 60 has an enlarged cavity surrounding the upper end of the sleeve 66 and communicating with the outlet port 64 whereby the outer or upper end of the valve member 70 is exposed to the fluid pressure in the outlet port 64. This outlet port pressure urges the valve member 70 inwardly against the fluid pressure within the chamber 86 and against a compression spring 88.

The valve member 70 has a passage therethrough including a restricted orifice 90 providing communication between the outlet port 64 and the chamber 86. The plug 82 also has a passage therethrough including a restricted orifice 92 providing a restricted vent passage for the chamber 86. The upper end of the plug vent passage forms a seat 94 for a ball-type check valve 96. The check valve 96 is held in position by a cage 98 which in turn is held against the seat 94 by the compression spring 88. A spring 100 serves to urge the check valve 96 off its seat toward a plurality of inwardly extending fingers 102 formed on the cage 98.

The compression of the spring 88 may be adjusted by rotative adjustment of said plug along its threads 84. A pin 104 extends across the sleeve 66 through slots 106 in the plug 82 to hold the plug in any position of adjustment. In addition a nut 108 holds the pin 104 in position on the sleeve 66. Shims 110 may be provided for setting the force of the spring 100 against the check valve 96.

With this construction of the device 52, when the control valve 48 is opened for supplying liquid from the pump 46 to the brake cylinder 42, there is no appreciable rise in pressure in said cylinder until sufficient liquid has been supplied to fill said cylinder and the passages between said cylinder and the pump 46. This only takes a small fraction of a second. As the pump 46 continues to supply liquid, the liquid pressure output of the pump quickly rises to some intermediate value less than the maximum pressure setting of the relief valve 58. At this intermediate pressure the valve member 70 is forced inwardly against the spring 88 whereby the valve portion 80 throttles further flow to the port 64 such that pressure in said port balances the force of the spring 88. The setting or compression of the spring 88 thus determines the magnitude of said intermediate value of pressure.

This much of the operation of the device 52 takes place quite quickly so that as yet there is little or no liquid within the chamber 86. Liquid flows into said chamber 86 through the restricted orifice 90 and at the same time liquid drains out of said chamber through the restricted vent passage 92. Thus before the chamber 86 is full there is a flow of liquid past the valve metering portion 80 through the orifice 90 and into and through the chamber 86 and at the same time the spring 88 positions the valve portion 80 to provide a pressure drop thereacross such that the pressure at the outlet port 64 is maintained at said intermediate value although the output pressure of the pump 46 has since risen to its maximum pressure as set by the relief valve 58. While the chamber 86 is only partly filled, the pressure drop across the restricted vent passageway 92 is only equal to the static head of liquid in said chamber and therefore is quite small compared to the pressure drop across the restricted passageway 90. Therefore, the sizes of the orifices 90 and 92 can readily be proportioned so that liquid flows into the chamber 86 at a faster rate than it drains therefrom and, as illustrated, the drain orifice 92 may even be larger than the inlet orifice 90. With liquid entering the chamber 86 at a faster rate than it drains therefrom, said chamber gradually fills up. The length of time required for the chamber to fill depends on the relative sizes of the orifices 90 and 92 so that even though the capacity of said chamber is small said length of time can readily be made quite large as compared to an arrangement in which the chamber has no such drain passage.

After the chamber 86 has been filled, the pressure in said chamber begins to increase thereby moving the valve member 70 in an opening direction (upwardly in the drawing) to increase the output pressure of the device 52 so as to maintain the fluid pressure and spring forces on the valve member 70 in balance. Liquid continues to flow into the chamber 86 through the orifice 90 because of its increasing size with opening movement of the valve member 70 and because liquid continues to drain from said chamber through the orifice 92. As a result of the increasing pressure in the chamber 86 the check valve 96 progressively closes. When the check valve 96 is fully closed, the magnitude of the pressure within the chamber 86 immediately rises to the magnitude of the pressure above the valve member 70 whereupon said valve member moves to its fully open position, as illustrated, and the full or maximum output pressure of the pump 46 is transmitted to the brake cylinder 42. Thus not only do the relative sizes of the orifices 90 and 92 determine the length of time the output pressure of the device 52 remains at said intermediate value but said relative sizes together with the spring setting of the check valve 96 determine the rate of increase of said pressure from said intermediate valve to the maximum output pressure determined by the relief valve 58.

It should now be apparent that the construction of the device 52 of the present invention permits a wide variation in the manner and rate at which its output pressure builds up to the maximum value of the input pressure supplied thereto to suit the requirements of each installation. For example, such variation can be effected by varying the relative sizes of the orifices 90 and 92, by changing the spring force on the check valve 96 and/or by changing the setting of the spring 88. Thus the device 52 can readily be adjusted to obtain a desired rate of engagement of the brake plates 36 and 38. Obviously the spring 88 must be set so that as long as the chamber 86 is not filled the valve member 70 operates to maintain the output pressure of the device 52 less than its maximum input pressure. Furthermore the check valve spring 100 should be adjusted so that said check valve closes at least when the pressure within the chamber 86 reaches said maximum value.

It should also be noted that the valve member 70 is never fully closed. That is, the valve metering edge 80 never completely covers the outlet openings 76. Accordingly even if the valve 70 sticks in this partly closed position this does not prevent the output fluid pressure of the device 52 from reaching its maximum input pressure. The danger of a ball-type check valve, such as the valve 96, sticking is substantially nil. Accordingly there is little or no possibility that malfunctioning of the device 52 could prevent the output pressure of said device from reaching its maximum input valve.

While we have described our invention in detail in its present preferred embodiment, it will be obvious to those skilled in the art, after understanding our invention that various changes and modifications may be made therein without departing from the spirit or scope thereof. We aim in the appended claims to cover all such modifications.

We claim as our invention:

1. A device for controlling the rate of increase of a liquid pressure; said device comprising means providing a liquid inlet port and a liquid outlet port; a chamber communicating with said outlet port; a valve movable in a closing direction to throttle flow of said liquid from said inlet port to said outlet port; and means operatively connected to said valve and automatically operable upon the supply of liquid under pressure to said inlet port for moving said valve to a throttling position until said chamber is full.

2. A device for controlling the rate of increase of a liquid pressure; said device comprising means providing a liquid inlet port and a liquid outlet port; a chamber communicating with said outlet port; a valve movable in a closing direction to throttle flow of said liquid from said inlet port to said outlet port; and means operatively connected to said valve and automatically operable upon the supply of liquid under pressure to said inlet port for moving said valve to a throttling position until said chamber is full, said means including means responsive to the pressure in said outlet port urging said valve in a closing direction and responsive to the pressure in said chamber urging said valve in an opening direction and also including means for moving said valve to its full open position when said chamber is full.

3. A device for controlling the rate of increase of a liquid pressure; said device comprising means providing a liquid inlet port and a liquid outlet port; a chamber communicating with said outlet port; a valve movable in a closing direction to throttle flow of said liquid from said inlet port to said outlet port; and means operatively connected to said valve and automatically operable upon the supply of liquid under pressure to said inlet port for moving said valve to a throttling position until said chamber is full, said means including means responsive to the pressure in said outlet port urging said valve in a closing direction and responsive to the pressure in said chamber urging said valve in an opening direction and also including a spring for urging said valve in an opening direction.

4. A device for controlling the rate of increase of a liquid pressure; said device comprising means providing a liquid inlet port and a liquid outlet port; a chamber having an inlet opening communicating with said outlet port and having a drain opening such that upon the supply of liquid to said inlet port and until said chamber is full the rate of liquid flow into said chamber is greater than the rate of liquid flow out of said chamber; a valve movable in a closing direction to throttle flow of said liquid from said inlet port to said outlet port; and means operatively connected to said valve and automatically operable upon the supply of liquid under pressure to said inlet port for moving said valve to a throttling position until said chamber is full and for moving said valve to its full open position when said chamber is full.

5. A device for controlling the rate of increase of a liquid pressure; said device comprising means providing a liquid inlet port and a liquid outlet port; a chamber having an inlet opening communicating with said outlet port and having a drain opening such that upon the supply of liquid to said inlet port and until said chamber is full the rate of liquid flow into said chamber is greater than the rate of liquid flow out of said chamber; a valve movable in a closing direction to throttle flow of said liquid from said inlet port to said outlet port; and means operatively connected to said valve and automatically operable upon the supply of liquid under pressure to said inlet port for moving said valve to a throttling position until said chamber is full, said means including means responsive to the pressure in said outlet port for urging said valve in a closing direction and responsive to the pressure within said chamber for urging said valve in an opening direction.

6. A device for controlling the rate of increase of a liquid pressure; said device comprising means providing a liquid inlet port and a liquid outlet port; a chamber having an inlet opening communicating with said outlet port and having a drain opening such that upon the supply of liquid to said inlet port and until said chamber is full the rate of liquid flow into said chamber is greater than the rate of liquid flow out of said chamber; a valve movable in a closing direction to throttle flow of said liquid from said inlet port to said outlet port; and means operatively connected to said valve and automatically operable upon the supply of liquid under pressure to said inlet port for moving said valve to a throttling position until said chamber is full, said means including means responsive to the pressure in said outlet port for urging said valve in a closing direction and responsive to the pressure within said chamber for urging said valve in an opening direction and also including a spring for urging said valve in an opening direction.

7. A device for controlling the rate of increase of a liquid pressure; said device comprising means providing a liquid inlet port and a liquid outlet port; a chamber; a first restricted opening providing communication between said chamber and said outlet port; a second restricted opening providing a vent for said chamber such that upon the supply of liquid under pressure to said inlet port and until said chamber is full the rate of liquid flow into said chamber is greater than the rate of liquid flow out of said chamber; a valve movable in a closing direction to throttle liquid flow from said inlet port to said outlet port; means operatively connected to said valve and automatically operable upon the supply of liquid under pressure to said inlet port for moving said valve to a throttling position until said chamber is full and for moving said valve to its full open position when said chamber is full; a valve for controlling the escape flow of liquid through said vent opening and urged in a closing direction by the pressure drop across said valve resulting from said escape flow; and a spring for holding said last-mentioned valve open against said pressure drop until said chamber has become at least partly filled with said liquid.

8. A device for controlling the rate of increase of a liquid pressure; said device comprising means providing a liquid inlet port and a liquid outlet port; a chamber having a first restricted opening providing communication between said chamber and said outlet port and having a second restricted opening providing a vent for said chamber such that upon the supply of liquid under pressure to said inlet port and until said chamber is full the rate of liquid flow into said chamber is greater than the rate of liquid flow out of said chamber; a valve movable in a closing direction to throttle liquid flow from said inlet port to said outlet port; means operatively connected to said valve and responsive to the pressure in said outlet port for urging said valve in a closing direction; and a valve for closing said vent opening after said chamber has become at least partly filled with said liquid.

9. A device for controlling the rate of increase of a liquid pressure; said device comprising means providing a liquid inlet port and a liquid outlet port; a chamber having a first restricted opening providing communication between said chamber and said outlet port and having a second restricted opening providing a vent for said chamber such that upon the supply of liquid under pressure to said inlet port and until said chamber is full the rate of liquid flow into said chamber is greater than the rate of liquid flow out of said chamber; a valve movable in a closing direction to throttle liquid flow from said inlet port to said outlet port; means operatively connected to said valve and including means responsive to the pressure within said outlet port for urging said valve in a closing direction and means responsive to the pressure in said chamber for urging said valve in an opening direction; said operatively connected means also including a spring for urging said valve in an opening direction; and a valve for closing said vent opening after said chamber has at least become partly filled with said liquid.

10. A device for controlling the rate of increase of a liquid pressure; said device comprising means providing a liquid inlet port and a liquid outlet port; a chamber having a first restricted opening providing communication between said chamber and said outlet port and having a second restricted opening providing a vent for said chamber such that upon the supply of liquid under pressure to said inlet port and until said chamber is full the rate of liquid flow into said chamber is greater than the rate of liquid flow out of said chamber; a valve movable in a closing direction to throttle liquid flow from said inlet port to said outlet port; means operatively connected to said valve and including means responsive to the pressure within said outlet port for urging said valve in a closing direction and means responsive to the pressure in said chamber for urging said valve in an opening direction, said operatively connected means also including a spring for urging said valve in an opening direction; a valve for controlling the escape flow of liquid through said vent opening and urged in a closing direction by the pressure drop across said last-mentioned valve resulting from said escape flow; and a spring for holding said last-mentioned valve open against said pressure drop until said chamber has become at least partly filled with said liquid.

11. A clutch or brake having frictionally engageable clutch or brake members; a cylinder; a piston slidable in said cylinder; a power-operated positive-displacement hydraulic pump; a passageway for supplying liquid from said pump to said cylinder for moving said piston to effect engagement of said members; and mechanism including a chamber having an inlet opening communicating with said passageway between said pump and cylinder for maintaining the pressure in said cylinder below a predetermined value until said chamber is full of said liquid, said chamber having an outlet drain opening such that upon the supply of liquid to said passageway by said pump liquid flows into said chamber from said passageway and out of said chamber through said drain opening to by-pass said cylinder and such that until said chamber is full the rate of liquid flow into said chamber is greater than the rate of liquid flow out of said chamber.

12. A clutch or brake having frictionally engageable clutch or brake members; a cylinder; a piston slidable in said cylinder; a power-operated positive-displacement hydraulic pump; a passageway for supplying liquid from said pump to said cylinder for moving said piston to effect engagement of said members; and mechanism for controlling the rate of increase of pressure in said cylinder; said mechanism comprising a chamber having an inlet opening communicating with said passageway between said pump and cylinder and having an outlet drain opening such that upon the supply of liquid to said passageway by said pump liquid flows into said chamber from said passageway and flows out of said chamber through said drain opening to by-pass said cylinder and until said chamber is full the rate of flow into said chamber is greater than the rate of flow out of said chamber, and a valve automatically operable to maintain the pressure in said cylinder below a predetermined value until said chamber is full.

13. In a clutch or brake having frictionally engageable clutch or brake members; a cylinder; a piston slidable in said cylinder; a power-operated positive-displacement hydraulic pump; a passageway for supplying liquid from said pump to said cylinder for moving said piston to effect engagement of said members; and mechanism for controlling the rate of increase of pressure in said cylinder from said pump; said mechanism comprising a chamber communicating with said passageway such that liquid flowing into said chamber from said passageway by-passes said cylinder, a valve movable in a closing direction to throttle flow of said liquid through said passageway toward said cylinder and into said chamber, and means for moving said valve to a throttling position until said chamber is full and for opening said valve when said chamber is full.

14. In a clutch or brake having frictionally engageable clutch or brake members; a cylinder; means including a piston slidable in said cylinder for effecting engagement and disengagement of said members; a power-operated positive-displacement hydraulic pump; a passageway for supplying liquid from said pump to said cylinder for moving said piston to effect engagement of said members; and mechanism for controlling the rate of increase of pressure in said cylinder; said mechanism comprising a chamber having a first restricted opening providing communication between said chamber and said passageway and having a second restricted opening providing a vent for said chamber such that upon the supply of liquid to said passageway by said pump and until said chamber is full the rate of liquid flow into said chamber is greater than the rate of liquid flow out of said chamber, a valve movable in a closing direction to throttle flow of liquid through said passageway toward said cylinder and into said chamber, means operatively connected to said valve and responsive to the pressure downstream of said valve for urging said valve in a closing direction and responsive to the pressure in said chamber for urging said valve in an opening direction, and a valve for closing said vent opening after said chamber has become at least partly filled with said liquid.

15. In a clutch or brake having frictionally engageable clutch or brake members; a cylinder; means including a piston slidable in said cylinder for effecting engagement and disengagement of said members; a power-operated positive-displacement hydraulic pump; a passageway for supplying liquid from said pump to said cylinder for moving said piston to effect engagement of said members; and mechanism for controlling the rate of increase of pressure in said cylinder; said mechanism comprising a chamber having a first restricted opening providing communication between said chamber and said passageway and having a second restricted opening providing a vent for said chamber such that upon the supply of liquid to said passageway by said pump and until said chamber is full the rate of liquid flow into said chamber is greater than the rate of liquid flow out of said chamber, a valve movable in a closing direction to throttle flow of liquid through said passageway toward said cylinder and into said chamber, means operatively connected to said valve and responsive to the pressure downstream of said valve for urging said valve in a closing direction and responsive to the pressure in said chamber for urging said valve in an opening direction, said operatively connected means including means for moving said valve to its full open position when said chamber is full, and a valve for closing said vent opening after said chamber has become at least partly filled with said liquid.

16. In a clutch or brake having frictionally engageable clutch or brake members; a cylinder, means including a piston slidable in said cylinder for effecting engagement and disengagement of said members; a power-operated positive-displacement hydraulic pump; a passageway for supplying liquid from said pump to said cylinder for moving said piston to effect engagement of said members; and mechanism for controlling the rate of increase of pressure in said cylinder; said mechanism comprising a chamber having a first restricted opening providing communication between said chamber and said passageway and having a second restricted opening providing a vent for said chamber such that upon the supply of liquid to said passageway by said pump and until said chamber is full the rate of liquid flow into said chamber is greater than the rate of liquid flow out of said chamber, a valve movable in a closing direction to throttle flow of liquid through said passageway toward said cylinder and into said chamber, means operatively connected to said valve and responsive to the pressure downstream of said valve for urging said valve in a closing direction and responsive to the pressure in said chamber for urging said valve in an opening direction, said operatively connected means including a spring urging said valve in an opening direction, a valve for controlling the escape flow of liquid through said vent opening and urged in a closing direction by the pressure drop across said valve resulting from said escape flow, and a spring for holding said last-mentioned valve open against said pressure drop until said chamber has become at least partly filled with said liquid.

References Cited in the file of this patent

UNITED STATES PATENTS

| | | |
|---|---|---|
| 2,020,640 | Guenther | Nov. 12, 1935 |
| 2,105,625 | Wichtendahl | Jan. 18, 1938 |
| 2,122,067 | Kress | June 28, 1938 |
| 2,159,170 | Maybach | May 23, 1939 |
| 2,329,742 | Bush et al. | Sept. 21, 1943 |
| 2,338,546 | Scholl | Jan. 4, 1944 |
| 2,376,545 | Livermore | May 22, 1945 |
| 2,472,694 | Chouings | June 7, 1949 |

FOREIGN PATENTS

| | | |
|---|---|---|
| 524,702 | Great Britain | Aug. 13, 1940 |